(12) United States Patent
Van Gestel et al.

(10) Patent No.: US 7,016,599 B2
(45) Date of Patent: Mar. 21, 2006

(54) ALLOCATING REAL TIME DATA ON A DISC LIKE RECORDING MEDIUM

(75) Inventors: Wilhelmus Jacobus Van Gestel, Eindhoven (NL); Arnoldus Jeroen Niessen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1036 days.

(21) Appl. No.: 09/729,607

(22) Filed: Dec. 4, 2000

(65) Prior Publication Data

US 2001/0016114 A1   Aug. 23, 2001

(30) Foreign Application Priority Data

Dec. 3, 1999   (EP) ................................. 99204121

(51) Int. Cl.
*H04N 5/91* (2006.01)

(52) U.S. Cl. ..................... 386/95; 386/125; 386/126; 369/47.14

(58) Field of Classification Search ................. 386/46, 386/95, 125–126, 124; 369/47.14, 53.15
See application file for complete search history.

(56) References Cited

U.S. PATENT DOCUMENTS

| 5,613,112 | A  |   | 3/1997  | Nagashima ................. 395/616 |
| 5,706,388 | A  |   | 1/1998  | Isaka .......................... 386/125 |
| 5,784,528 | A  |   | 7/1998  | Yamane et al. ............. 386/112 |
| 6,118,924 | A  | * | 9/2000  | Nakatani et al. ............ 386/126 |
| 6,501,905 | B1 | * | 12/2002 | Kimura ....................... 386/125 |
| 6,530,037 | B1 | * | 3/2003  | Ando et al. .................... 714/8 |
| 6,665,690 | B1 | * | 12/2003 | Kimura et al. ................. 386/95 |
| 6,728,175 | B1 | * | 4/2004  | Kimura et al. ........... 369/47.14 |
| 2002/0057636 | A1 | * | 5/2002  | Kimura et al. ........... 369/53.15 |
| 2004/0264922 | A1 | * | 12/2004 | Gotoh et al. .................. 386/52 |

FOREIGN PATENT DOCUMENTS

| EP | 0081184 A2 | 6/1983 |
| EP | 0909095 A1 | 4/1999 |
| FR | 2787962 A1 | 6/2000 |

* cited by examiner

*Primary Examiner*—Vincent Boccio
(74) *Attorney, Agent, or Firm*—Larry Liberchuk (57) ABSTRACT

Method of recording a series of ordered real-time information signals, such as audio/video information, on a disc like recording medium, such as an optically readable disc. The method comprises recording of contiguous sequences of detectable marks, each sequence representing a successive series of information signals of an A/V program, in a distributed manner across the recordable area of the disc like recording medium. Between the recorded sequences, preferably free space remains available for recording contiguous sequences of information signals of another A/V program in a same distributed manner. In an embodiment, a logical address space is divided in successive allocation areas, each allocation area used for subsequently recording a specific sequence of an A/V program.

21 Claims, 8 Drawing Sheets

ALLOCATING REAL TIME DATA ON A DISC LIKE RECORDING MEDIUM

FIELD OF THE INVENTION

The invention relates to a method of recording a sequence of ordered real-time information signals, such as audio/video information, on a disc like recording medium, such as an optically readable disc, the method comprising applying a sequence of marks, representing a sequence of information signals of a recording, along a spiral track on the disc like recording medium, wherein said marks are allocated contiguously in fragments, the fragments being separately addressable.

The invention also relates to a method of simultaneously reproducing and recording sequences of ordered real-time information signals, such as audio/video information, from or on a disc like recording medium, such as an optically readable disc, wherein at least a first sequence of marks, representing the information signals of a first recording, has been recorded according to the method of invention.

The invention further relates to a disc like recording medium, such as an optical disc, provided with marks representing real time information signals, such as audio/video information, allocated in response to the method of the invention.

Next the invention relates to an apparatus for recording a sequence of real-time information signals, such as audio/video information, on a disc like recording medium, such as an optically readable disc, the apparatus comprising receiving means for receiving real time information signals for recording, writing means for applying a sequence of marks, representing a sequence of real time information signals of a recording, along a spiral track of the disc like recording medium, and control means for controlling the writing means such as to apply said marks in separately addressable fragments of contiguously recorded marks.

The invention finally relates to an apparatus for simultaneously reproducing and recording sequences of ordered real time information signals, such as audio/video information, from or on a disc like recording medium, such as an optically readable disc, wherein the information signals are recorded on the disc like recording medium by marks arranged along a spiral track of the disc like recording medium and are allocated in addressable fragments of contiguously recorded marks, wherein at least a first sequence of marks, representing the information signals of a first recording, has been recorded according to the method of the invention, the apparatus comprising receiving means for receiving real time information signals for recording, writing means for applying a fragment of marks representing information signals received by the receiving means on the disc like recording medium, reading means for reading at least a fragment of marks from the disc like recording medium, reproducing means for reproducing real time information signals represented by the marks read.

A mark comprises a small area with different magnetic and/or optical characteristics relative to the surrounding area. An area with a different crystalline phase or dye may constitute an optically detectable mark. Such marks may be applied by locally heating a recordable surface of a disc like recording medium with a focused laser beam.

BACKGROUND OF THE INVENTION

Allocation of data on a disc like record carrier of the read only type, such as an audio CD or a video CD is done most frequently contiguously in order to guarantee seamless playback. Apparatuses for reproducing data stored on these carriers, are provided with data read buffers to enable a minimal amount of data read to be stored temporarily. In this manner a seamless flow of information is guaranteed even when no data is read from the carrier due to, for instance, a required displacement of a data reading head, such as an optical pick up unit. The size of these data read buffers is preferably kept low for obvious reasons of cost. Time for displacement of a data reading head is therefore restricted. This makes it troublesome, in case of a rewritable disc like carrier, to seamlessly read one program and writing another program simultaneously. If during switching between reading and writing the programs are recorded contiguously, a reading/writing head would have to jump across a large area of the disc.

U.S. Pat. No. 5,706,388 discloses a system for performing a reproducing operation of previously recorded video information without stopping a recording operation of information currently being received. Data is recorded in the receiving order in consecutive areas on a recording medium such as a hard disk drive or an optical disc. Two reception buffers and two reproduction buffers are provided to be able to record and reproduce data simultaneously. While the reproducing operation is performed, the digital data corresponding to the received information is continuously supplied to and stored in either of the reception buffers. When a predetermined amount of data has been reproduced and stored in the reproduction buffer, a read out operation of the reproduction buffer starts. At the same time, the recording/reproducing head returns to the last recording position for the data supplied from either of the reception buffers. When the predetermined amount of data is recorded on the recording medium, the reproducing/recording head moves again to the last reproducing position to reproduce the predetermined amount of data.

Data is recorded/reproduced on the recording medium in blocks on areas of the recording medium, the size of the areas corresponding to the capacity of the buffers. However, previously recorded areas are written contiguously, therefore the recording/reproducing head jumps across a large area of the recording medium during switching between recording and reproduction. This necessitates large and costly buffers.

The European patent application EP-A 081 184, discloses a disc of the read-only optical type with the data on one program stored in duplicate. In case a defect occurs in part of the data of a program, the corresponding part can be acquired from the duplicate version of the program. In order to limit the search time of an optical pick up unit for this duplicate date, the data of the two identical programs is stored in an interleaved manner, either in annular band or track interleaved manner. However, multiple programs will be stored serially after each other, each interleaved with their duplicates, also requiring large access times when reproducing one program and recording another program.

The U.S. Pat. No. 5,784,528 discloses a method for storing a real time bit stream of video objects on a read-only disc of the optical type, according to the DVD-format. This format allows storage of multi-angle scenes. A user is able to select particular scenes from a multi-scene period. The data of a multi-scene is stored in an interleaved manner to assure seamless data reproduction. However, a next bit stream of video objects is stored after the previous stored one.

The two last mentioned disclosures both describe data of one program stored interleaved on the recording medium in order to reduce jumping time of an optical pick up unit, either in case of defects or in case switching of scenes within one program. However, data of one program is stored contiguously after data of the previous program.

The U.S. Pat. No. 5,613,112 relates to method of managing recordable areas with respect to a disc like recording medium capable of recording data such as music data. The disc is of the magneto-optical type. Program data is recorded in segments comprising a track portion of several tracks in which data is recorded physically contiguous. In practice, the segments of one program may be spaced apart, leading to large access times. According to the disclosed method, the distance between the segments of one program is minimized, in order to reduce the access time. To this purpose the sequential segments are managed to be at locations as close to each other as possible.

Therefore, in practice, programs will also be stored as much as possible sequentially after each other.

OBJECT AND SUMMARY OF THE INVENTION

In consequence, amongst other things, it is an object of the invention to obviate above-mentioned disadvantages. According to one of its aspects a method according to the invention is characterized by allocating allocation extents of at least one fragment, with fragments within an allocation extent allocated contiguously, the allocation extents located preferably in a distributed manner over the recordable area of the disc like recording medium with preferably free space areas in the neighborhood of the separate allocation extents, said free space being available for subsequently allocating allocation extents of a subsequent recording.

Further according to one of its aspects an apparatus according to the invention is characterized in that, the apparatus comprises allocation means adapted to allocate allocation extents of at least one fragment, with fragments within a allocation extent allocated contiguously, the allocation extents located preferably in a distributed manner over the recordable area of the disc like recording medium with preferably free space areas in the neighborhood of the separate allocation extents, said free space being available for applying further allocation extents of a subsequent recording and the control means are adapted to control the writing means such as to apply marks in the allocation extents.

The invention is based on the following recognition. Contrary to what is taught by the cited art, data of a continuous sequence of data such as an audio or video program, is distributed across the available recordable area. At least on the level of at least one fragment. This will obviously lead to additional displacements of a reading/writing unit, resulting in more noise, power consumption, wear and constraints on the buffering. This is also known as data fragmentation that is normally regarded as a disadvantage occurring with hard disk drives after multiple deletions and rewriting. However, an advantage is obtained when storing more then one program. The fragments of second program may now be allocated next to data of the first program. Thus reducing, with respect to the situation when the programs are allocated sequential after each other, the displacement of a reading/writing head in case of simultaneously recording the second program while reproducing the first program.

An advantageous method according to invention is characterized by allocating allocation extents representing neighboring real time information signals in the ordered sequence of information signals, preferably spatially in each other neighborhood on the disc like recording medium. With the restriction that free space remains in between, the time for displacement of one sequence of real time signals stays within limits.

A further advantageous method according to the invention is characterized by allocating the allocation extents in consecutive order in either inward or outward direction along the radius of the recording medium. With a disc rotating with substantially a constant linear velocity, a speed-up or speed-down of the angular velocity of the disc like recording medium is kept as small as possible when jumping to successive allocation extents.

A next advantageous method according to the invention is characterized by continuing allocating allocation extents in a reversed order from the inner, respectively the outer diameter of a recordable area of the recording medium when reaching the inner, respectively the outer diameter. In this way large jumps across the disc diameter can be avoided when reaching a limiting diameter.

Another embodiment of the invention is characterized by dividing a logical address space related to the recording medium in successive allocation areas, dividing each allocation area in allocation zones, and allocating the allocation extents in the allocation zones. This simplifies the allocation during recording as only referral need to be made to a specific allocation zone in a specific allocation area, in stead to a more detailed absolute address location. The number of fragments in an allocation extent and the size of an allocation zone in units of fragments may be varied to optimize the method for specific situations. For instance an allocation zone size may be vary between 10 to 200 fragments, while an allocation extent size may be vary between 1 to 36 fragments.

A method wherein the disc like recording medium is divided in successive annular bands, the annular bands spanning contiguous parts of the disc like recording medium, while rotating the disc like recording medium with a constant angular velocity during recording in an annular band, a next advantageous method according to the invention is characterized by allocating an allocation extent in an annular band, wherein successive allocation extents are allocated in successive annular bands, a annular band having a size adapted to allocate therein additional allocation extents representing a second recording. Increasing or decreasing of the angular velocity (spin-up or spin-down) is only needed when a read/write head assembly jumps to a next annular band. By limiting an allocation extent to an annular band, the time allowed to jump to a next allocation extent in another annular band may be used for a spin-up or spin-down of the disc.

In a method wherein the recording medium is adapted to record marks of the optically readable type in mutually alternating spiral groove and land tracks, an advantageous method is characterized by allocating an allocation extent in either in a groove track or in a land track. There is no need to change from following a groove track to a land track or vice versa while recording an allocation extent.

A further advantageous embodiment of this method is characterized by allocating successive allocation zones located in groove tracks in a first order and in land tracks in a second, opposite order. When an inner, respectively outer diameter of the disc is reached when following a track of the first kind, no jump to an outer, respectively inner diameter of the disc is required when proceeding with following a track of a second kind.

BRIEF DESCRIPTION OF THE DRAWINGS

These and further aspects and advantages of the invention will be discussed in more detail hereinafter with reference to the disclosure of preferred embodiments, and in particular with reference to the appended Figures that show.

DESCRIPTION OF THE EMBODIMENTS

FIG. 1 illustrates a known method of allocating data on a recording area of a disc like recording medium. A part of the recording area is schematically depicted as a horizontal bar 1 that represents a part of a spiral track on the disc like recording medium. As will be shown in more detail with reference to FIGS. 7–9, the recording area of a rotationally driven disc may comprise one ore more spiral tracks along which detectable marks, representing the recorded data, are being arranged. The marks may be of the optically or magnetically detectable type. Hereinafter, with the term allocation will be meant reserving or allocating a part of a recordable area for storage of data. This may or may not include actually writing of the data in an allocated area, dependent on the example given.

Figure 1A:
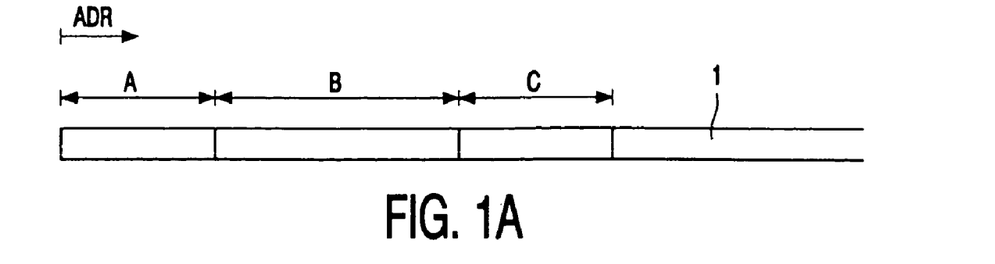
FIGS. 1A–1E first example of a known method of allocating data contiguously.

FIG. 1A shows, in a physical address space, the allocation (or in view of the above: the result of allocation) of respectively three pre-recorded sequences of real time audio and/or video data, hereafter denoted respectively as program A, B and C. The denotation of real time is used to indicate that recording and reproducing or playing back of a sequence of data is performed seamlessly, contrary to non real time data. The allocated audio or video data is digitized and is compressed according to known compression standards such a MPEG-2. This digitized and compressed data is furthermore coded according to known channel coding algorithms equivalent to the EFM coding known from compact discs or CD or EFM+ coding known from DVD discs.

In order to enable seamless play or record, the data of each program is stored physically contiguously on the recording medium along direction ADR. In that case there is no need for sudden significant displacements of a single reading/writing head assembly during which the data rate cannot be sustained. Subsequent programs B and C are allocated next to the previous program A and next to each other. For example, with a recording medium capacity of 10 Gbyte, there may be 2 to 6 programs stored on the recording medium.

Figure 1B:
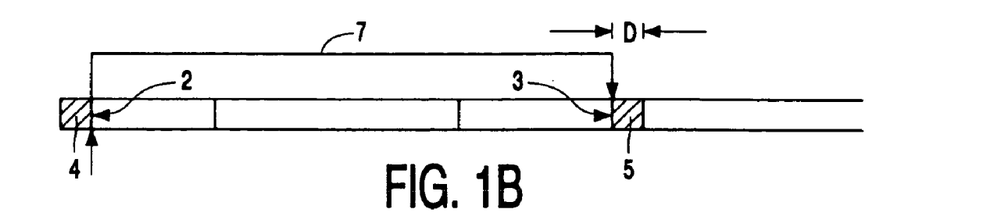
Figure 1C:
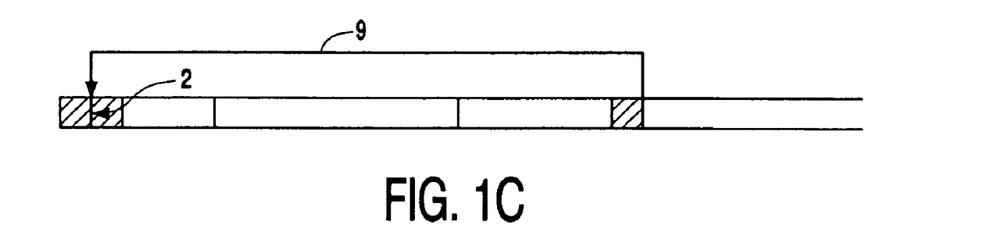
Figure 1D:
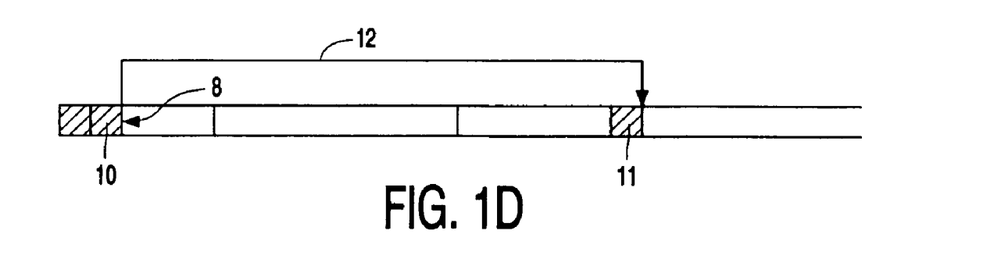
Figure 1E:
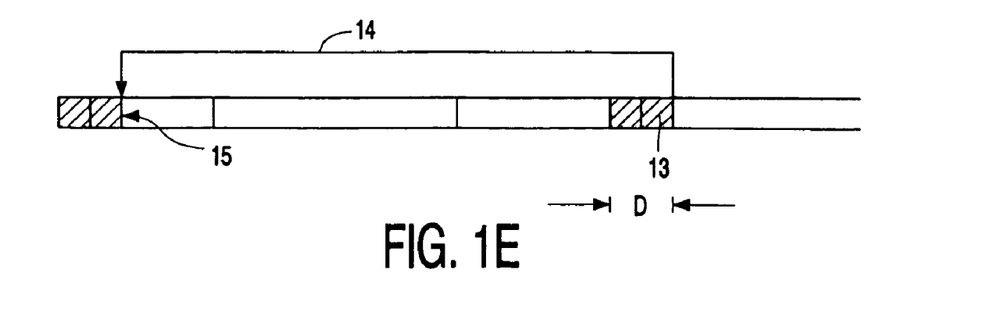

When a new program D, such as illustrated with reference to FIG. 1B, is to be recorded while the pre-recorded program A should be reproduced meanwhile, a reading/writing head assembly will have to jump, as indicated by the arrow 7, from a reading position 2 of program A, after having read a specific amount of data 4 from the recording medium, to a writing position 3 of program D in order to write a specific amount of data 5 to the recording medium. After having written the specific amount of data 5 to the recording medium, the reading/writing head assembly is displaced as indicated with arrow 9 in FIG. 1C, to the previous reading position 2 of program A. After having read the specific amount of data 10 (FIG. 1D), the reading/writing head assembly is displaced again, as indicated with arrow 12 in FIG. 1D, to the next writing position 11 of program D. After having written a specific amount of data 13 of program D (FIG. 1E), the reading/writing head assembly is displaced, as indicated by arrow 14 in FIG. 1E, to the subsequent reading position 15 of program A.

The specific amounts 4, 5, 10, 11 and 13 of data are chosen so that the data flow to an encoder, respectively decoder, can be sustained during the time required for reading, respectively writing a next amount of data in respective corresponding buffer memories. However, the time required for displacement of a reading/writing head assembly may also add a significant amount of time. Especially when a disc like recording medium rotates with a constant linear velocity, leading to a high angular velocity at an inner side of a disc and a low angular velocity at an outer side of a disc. Each radial displacement of the reading/writing head assembly position will require a spin up or a spin down of the disc. This leads to a significant increase of the access time of the data and therefore also to size of the buffer memories. Further additional wear, noise and power consumption results. It is clear that during simultaneously reproducing and recording, by switching alternately between reading and writing between two programs comprising serially and contiguously allocated data, results in large buffers, noise and wear.

Figure 2A:
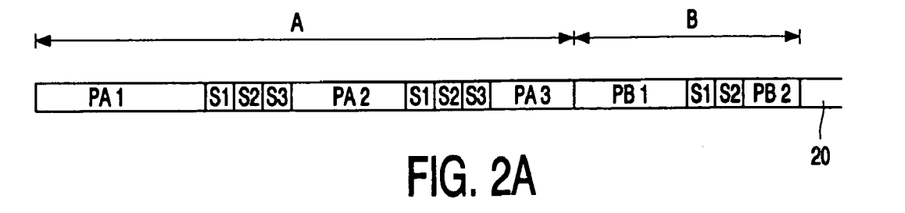
FIG. 2A and FIG. 2B second and third example of a known method of allocating data contiguously and interleaved.

FIG. 2A illustrates another known method of allocating real time data on a disc like recording medium. Shown is again a physical address space 20, representing part of a track along which the data is being arranged. A program A comprises three program parts PA1, PA2 and PA3, each representing a real time series of single scenery audio/video data, and multi-scenery parts S1, S2 and S3, each representing a different scene setting, such as camera angle, of the same event. A user should be able to switch practically instantaneously between the several scenes S1, S2 and S3. To achieve this, the corresponding multi scenery data is stored interleaved. This is known for instance from the DVD-ROM format.

However, a next program B is stored in its entirety next to end of program A, leading to the previously mentioned disadvantages when alternately reading/writing program A and program B.

Figure 2B:
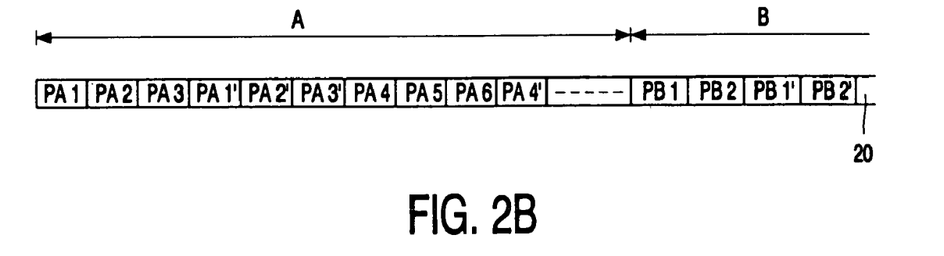

FIG. 2B shows a further known method of allocating data. In this method data of a program is stored in duplicate for safety reasons. The parts PA1, PA2 and PA3 of program A are followed by the corresponding duplicate parts PA1', PA2' and PA3. When an error occurs reading a part, the duplicate part can be accessed in reasonable time. However, a subsequent program B is stored again after program A.

Figure 3A:
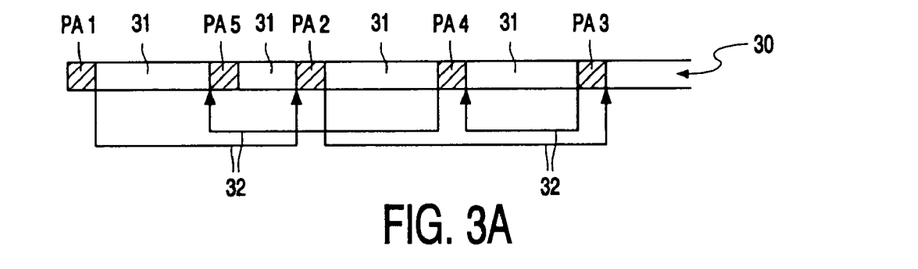
FIG. 3 several methods of allocating data according to the invention.

FIG. 3A shows a first method according to the invention of allocating real time audio/video data to a disc like recording medium. As in the previous figure a part of the physical recordable area 30 along a track of a disc like recording medium is shown. According to this method, subsequent amounts of data PA1, PA2, PA3, PA4 . . . of a program A are not allocated contiguously to each other but, on the contrary, fragmented over the recording area 30. This is done with free space areas 31 between the allocated areas, each free space area 31 being large enough to store one or more similar amounts of data. This leads to the disadvantage that during record and play back only, a reading/writing head assembly will have to make a displacement each time a specific amount of data is read or written, as indicated by the arrows 32 in FIG. 3A. But, when simultaneously reproducing the program A and recording a next program, the parts of the next program can be written in the neighborhood of the parts just read. This leads to a significant reduction of the size of displacements, in case of alternately reading and writing, compared to the previously described known methods of allocating data of a sequence of real time data contiguously.

Figure 3B:
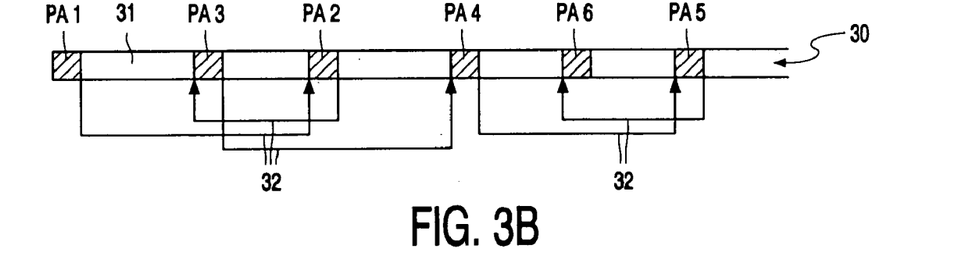

FIG. 3B shows an advantageous embodiment of the method of the invention. In order to limit the size of displacements 32, the amounts of data PA1, PA2, PA3 . . . are preferably allocated in each neighborhood.

Figure 3C:
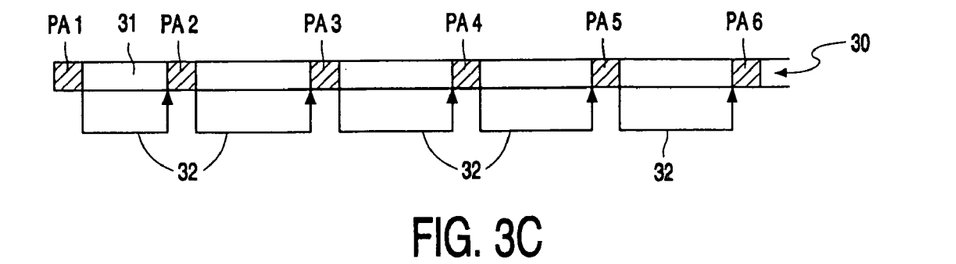

A further advantageous embodiment of the method according to the invention is shown in FIG. 3C. The amounts of data PA1, PA2,PA3, . . . are preferably allocated in a sequence that corresponds to the sequence of reproducing. This further minimizes the size of displacements.

Figure 3D:
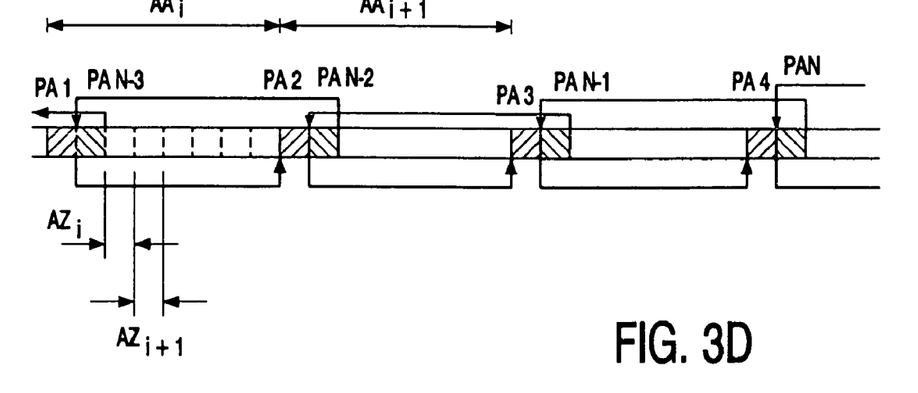

A further advantageous embodiment is illustrated in FIG. 3D, wherein a logical address space of a recording medium is divided in predefined successive allocation areas $AA_i$, $AA_{i+1}$ . . . . Successive parts PA1, PA2 of a program A are allocated in such successive allocation areas $AA_i$, $AA_{i+1}$. By using references to allocation areas in stead to absolute addresses, a simplified addressing scheme is achieved. The allocation areas $AA_i$, $AA_{i+1}$ . . . may be subdivided in further allocations zones $AZ_i$, $AZ_{i+1}$ . . . . Writing continues until allocation zones $AZ_i$, $AZ_{i+1}$ are filled.

On a disc like recording medium, successive allocation areas $AA_i$, $AA_{i+1}$ . . . have to be mapped on the physical address space. A physical address space may be ordered in a direction from an inner to an outer diameter of the disc. Writing parts of a program is performed in successive order in a radial direction. When the inner or outer diameter is reached, the writing continues in a reverse direction. This so-called zig-zag writing avoids large jumps when reaching the inner/outer diameter of an disc. This principle is illustrated in FIG. 3D.

Also is shown in FIG. 3D, that a next part PA of the program A to be written, is allocated preferably contiguously to a previously written part PA of the program A.

Figure 4A:
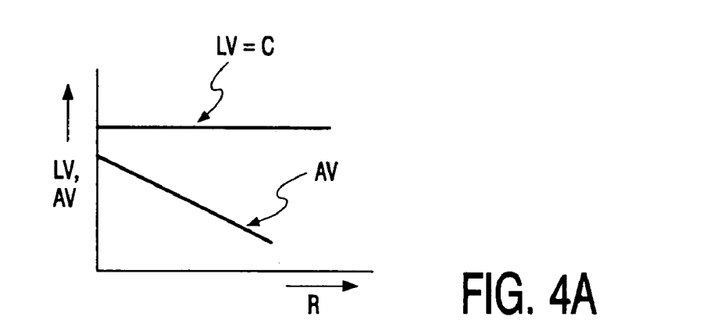
FIG. 4 diagrams illustrating several driving modes of a disc like recording medium.
Figure 4B:
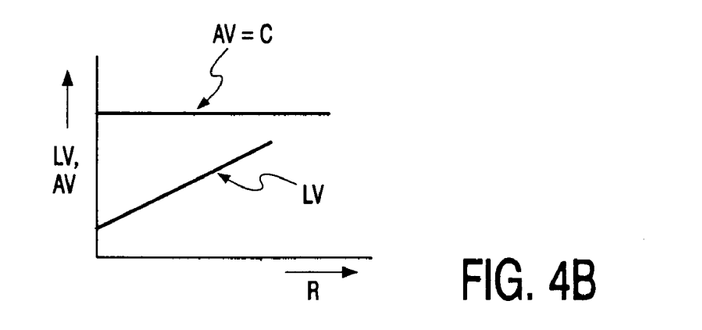

A disc like recording medium may be driven according to several rotational modes. A first CAV mode is characterized by a constant angular velocity, which is the preferred mode with magnetic hard disk drives. As shown with reference to FIG. 4B, if the angular velocity AV remains constant (AV=C), the linear velocity LV depends on the radial position R and increases in outward direction. The advantage of this CAV mode is that no spin-up or spin-down of the disc like recording medium is required during displacement of a single reading/writing head assembly. This is contrary to a second CLV mode, illustrated in FIG. 4A that is characterized by a constant linear velocity (LV=C), which is a mode often seen with optical discs. The advantage of this mode is the more efficient use of storage capacity as the data rate and data density recorded on a disc is constant. However, higher access times are required, due to spin up or spin down of the disc.

Figure 4C:
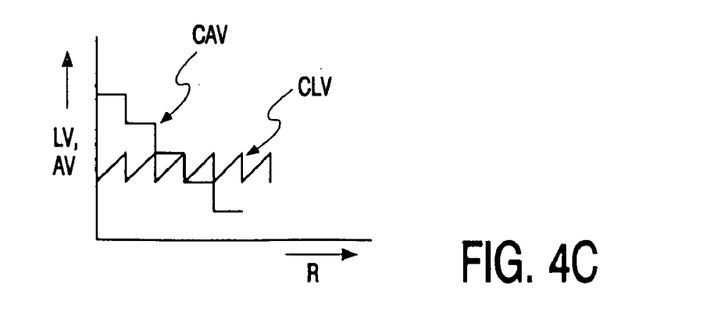

However, a mixture of both modes CAV and CLV exists. For instance, dividing a disc into several annular zones, with each zone spanning a contiguous area, and maintaining within each zone a constant angular velocity, the advantages of both modes are combined. This may be called a quasi CLV mode. FIG. 4C gives an example of such a mode with a stepwise decreasing angular velocity with increasing radial position R.

FIG. 5 illustrates a next embodiment of the method according to the invention. The recordable logical space of a disc like recording medium along a spiral track, a part 50 of which is shown schematically in FIG. 5, is divided in successive allocation areas $AA_j$, $AA_{j+1}$, . . . of a predetermined size. Each separate amount of data PA1, PA2 . . . of program A representing a sequence of real time A/V data, is stored, in an embodiment of the invention, preferably respectively in a separate allocation area $AA_j$, $AA_{j+1}$ . . . . This may be done according to one of the previous disclosed methods for allocating fragmented data. This method has the advantage that such allocation areas may be linked to physically annular bands in a physical address space, each having a constant angular velocity within a band, such as discussed with reference to FIG. 4C. This means that reading and writing within such an annular band can be done without changing the angular velocity. Apart from this, a division in allocation areas $AA_j$, $AA_{j+1}$ . . . simplifies the method of allocating data in a distributed manner. For example, a different distribution can be obtained easily by simply changing the size of an allocation area.

It is remarked that although the logical address space may be ordered contiguously, the corresponding physical address space may not so. With an optical record carrier comprising several annular bands with each band having a separate, but constant angular velocity, tracks at the start or end of a band may not be used, due to track following. Furthermore, a part of an annular band may be reserved for defect management. A read/write assembly unit will have to jump at these specific places, therefore preferably an allocation area should not include such an unused physical area.

As will be illustrated with reference to FIG. 5, amounts of data PB1, PB2 of a subsequent sequence of real time A/V data or program B, is recorded in the similar distributed or fragmented manner as the parts PA1, PA2 . . . of the previously recorded program A has been recorded. Furthermore, it will be illustrated that program A may be reproduced simultaneously during recording program B. This is done by reading and writing fixed sized amounts of separately addressable data, called fragments 52, alternately by one writing/reading head assembly.

A fragment 52 may be regarded as the smallest separately addressable unit of a fixed size. A part of data allocated contiguously, such as a part PA1 of a program A, may comprise several such fragments 52 and constitute a allocation extent of fragments 53. As an example, in case of real time data constituted by MPEG2 compressed video/audio, a fragment may comprise 2 to 8 Mbyte, while an allocation extent of fragments may comprise one or tenths of fragments. A fragment may comprises one ore more error correction blocks (ECC) of a size of, for instance, 64 Kbyte each. For example, a fragment of 60 ECC blocks constitutes a fragment size of 4 Mbyte. Further, the size of an allocation area may comprise ten to hundreds of fragments. It is noted that a unit of allocation of non real time data may be much smaller, such as 2 Kbyte.

Figure 5A:
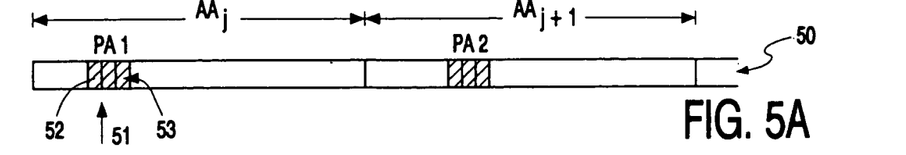
FIGS. 5A–5I further method of alternately allocating and reading data according to the invention.
Figure 5B:
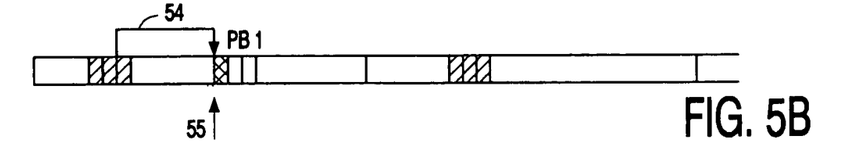

FIG. 5A illustrates the method starting at a read position 51 after having read a fragment 52 of the allocation extent of fragments 53 representing part PA1 of program A. FIG.

Figure 5C:
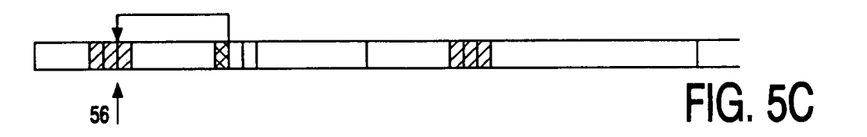
Figure 5D:
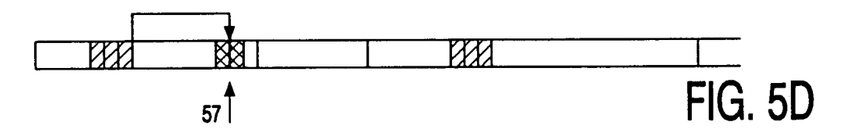
Figure 5E:
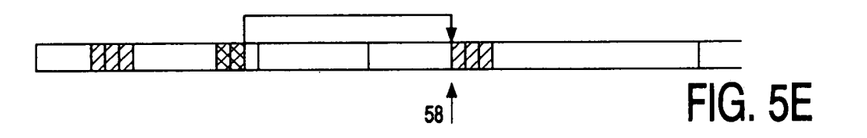
Figure 5F:
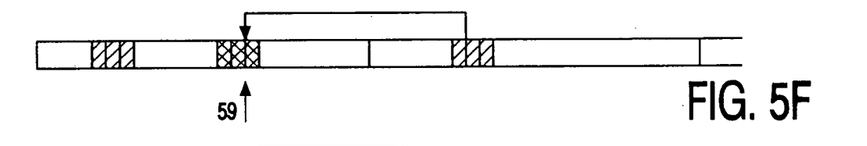
Figure 5G:
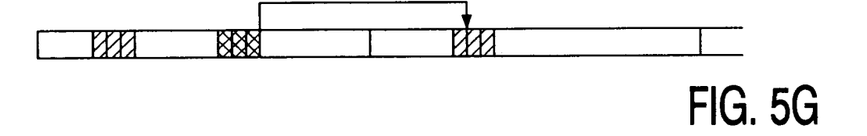
Figure 5H:
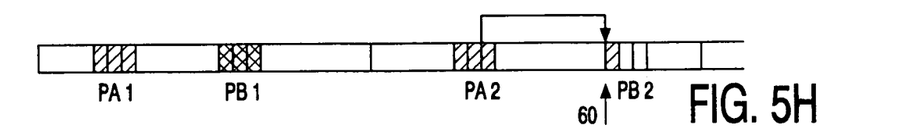

5B illustrates the subsequent displacement 54 of a reading/writing head assembly to a write position 55 in the same allocation area $AA_j$ of a fragment 52 of part PB1 of program B. After allocating and writing this fragment 52, a jump is made to the next fragment of part PA1 to be read at read position 56 (FIG. 5C). After reading this last fragment of part PA1, a jump is made to a write position 57 (FIG. 5D), to allocate and write a second fragment of part PB1. FIG. 5E illustrates writing this second fragment followed by a jump to a read position 58, in the next allocation area $AA_{j+1}$ of the first fragment of next part PA2 of program A. After reading this fragment, this is followed by a jump (FIG. 5F) to the write position 59 in the previous allocation area for allocating and writing the third and last fragment of part PB1. Hereafter, allocation area $AA_j$ is left, and a jump is made to the second fragment of the next part PA1 in the allocation area $AA_{j+1}$ (FIG. 5G) and the sequence of alternately reading and writing is repeated with writing the first fragment of the part PB2 at write position 60 (FIG. 5H).

FIG. 6 illustrates another embodiment of the method according to the invention, related to simultaneously reproducing and recording a real time sequence of A/V data, referred to as a program. In this embodiment it is shown how data is allocated in case that the data rate of writing a program B is twice the data rate of reading a program A. FIG. 6 will show that that with respect to the program B, twice the amount of free space in a zone is allocated compared to the program A. Therefore, it is clear that the disc access pattern and the allocating pattern can change if the data rate changes.

Figure 6A:
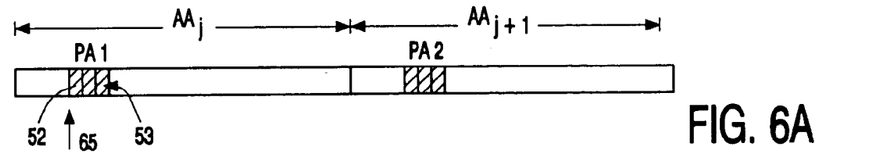
FIGS. 6A–6J next method of alternately allocating and reading data according to the invention.
Figure 6B:
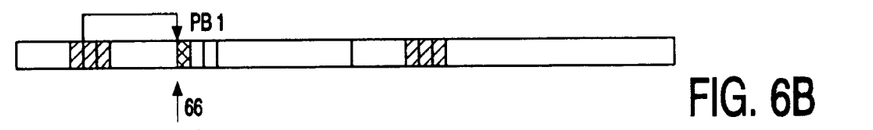
Figure 6C:
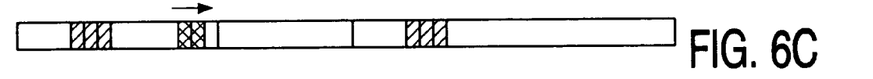
Figure 6D:
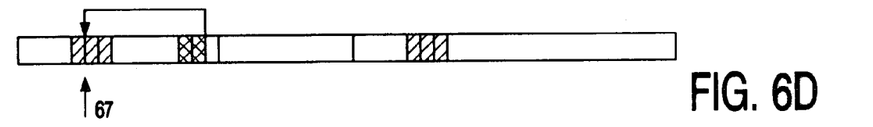
Figure 6E:
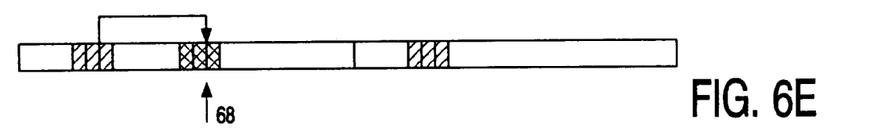
Figure 6F:
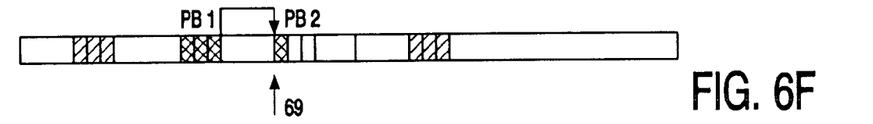
Figure 6G:
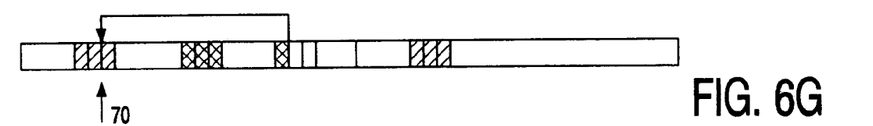
Figure 6H:
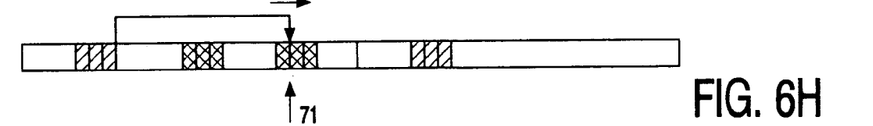
Figure 6I:
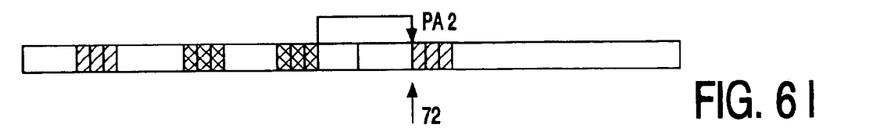
Figure 6J:
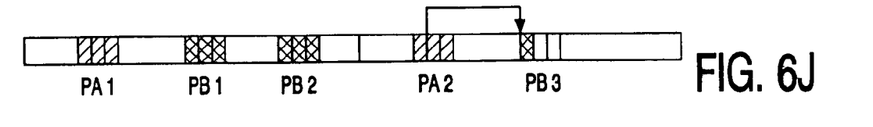

FIG. 6A shows the read position 65 for reading a fragment 52 of an allocation extent of fragments 53 corresponding to part PA1 of program A. After reading, a jump is made to the write position 66 of the first fragment of part PB1 of the program B (FIG. 6B). Two successive fragments are written (FIG. 6C) before jumping back to the read position 67 for reading a next fragment of part PA1 (FIG. 6D). After reading this fragment, a jump is made to a write position 68 for writing the last fragment of part PB1 (FIG. 6E). After writing this fragment a jump is made to the write position 69 for writing the first fragment of a next allocation extent of fragments representing a successive part PB2 of program B (FIG. 6F). FIG. 6G illustrates jumping to read position 70 for reading the last fragment of part PA1. Then, with reference to FIG. 6H, is jumped to write position 71 for writing the last two fragments of part PB2. The sequence repeats itself by jumping to read position 72 (FIG. 6I) for reading the first fragment of part PA2 in the next allocation area $AA_{j+1}$ (FIG. 6I)

A disc like recording medium of the optically type, such as a CD or DVD disc, comprises tracks along which optically detectable marks are being arranged. Such a track may take the form of one ore more spiral grooves with for instance local depressions representing the marks. In addition marks may be present in the area between the grooves, the so-called lands, resulting in a neighboring non-groove or land track. Marks represented by local depressions may be obtained by known manufacturing methods such as injection molding. However in case or recordable or rewritable record carriers this may be done by applying locally heat with a high power focused laser beam. With phase change materials marks take the form of distinct reflective crystalline or non-reflective amorphous areas.

Figure 5I:
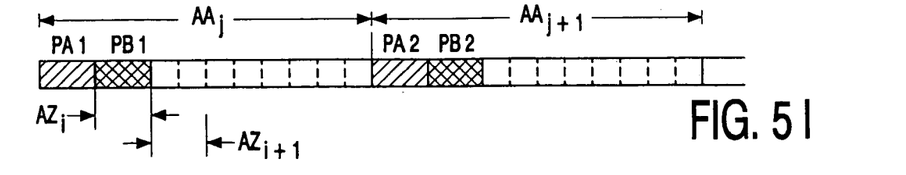

FIG. 5I shows the parts of program A en B allocated in allocation zones $AZ_i$, $AZ_{i+1}$, . . . similar as shown with reference to FIG. 3D. This gives the advantage of a predefined reservation of space within an allocation zone $AZ_i$. It further simplifies addressing within an allocation zone $AZ_i$. A allocation zone $AZ_i$ may be written with fragments until it is completely filled. It is advantageous to allocate the parts PB of program B, next to the parts PA of the previously recorded program A.

Figure 7A:
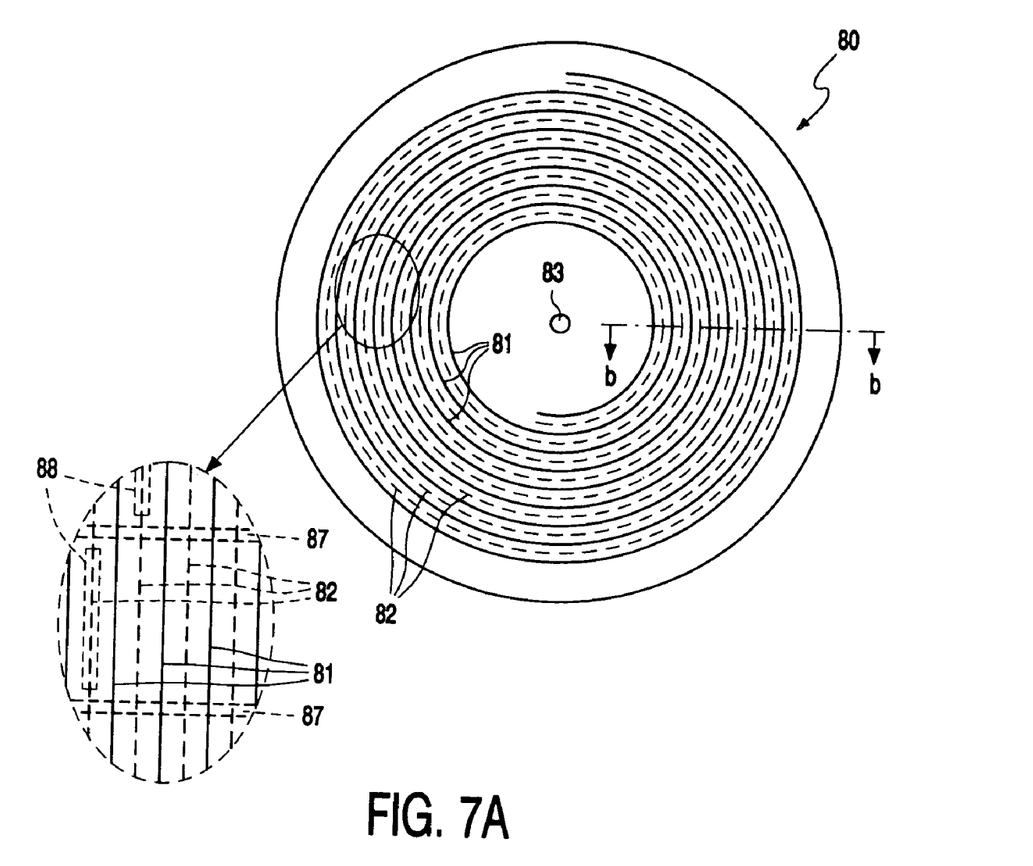
FIG. 7 schematically a disc like recording medium.
Figure 7B:
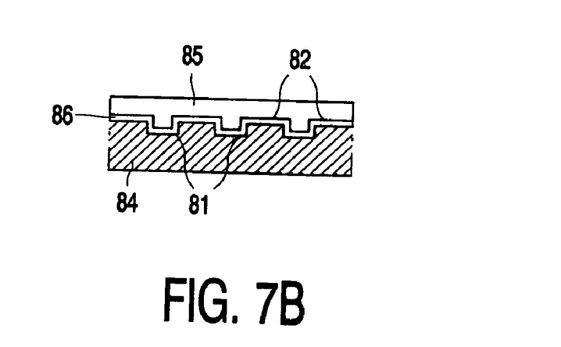

FIG. 7A illustrates an example of such disc like recording medium 80 comprising groove tracks 81 and land tracks 82 along which marks representing data are arranged. A centering hole 83 is present for locating the disc 80 around a rotating axis of a recording or reproducing apparatus. A cross section view of part of the disc 80 along the line b—b is shown in FIG. 7B. A substrate layer 84 is covered with a protecting cover layer 85. The groove tracks 81 and land tracks 82 are covered with an optically reflecting layer for reflecting light of a reading beam.

The groove and land tracks 81 and 82 may be divided into separate parts or segments 88, by previously applied separating address marks in pre-embossed areas 87 in order to facilitate addressing of the respective segments 88. Such segments 88 may comprise a part of one circular track or extend over several circular tracks. Such a physical addressing or separation in land and groove tracks may be advantageously used to allocate data according to the invention. For instance data of one program may be located preferably in land tracks, while the groove tracks are at first instance reserved as free space for future recordings. Or, as another example, physically neighboring segments 88 that are approximately located at regular increasing angles may be reserved for allocating a fragment or a allocation extent of fragments. This avoids longer access times due to waiting for making a disc a full rotation, called rotational delay. A man skilled in the art will be able to allocate data according to the invention and preserving free space in accordance with the specific physical structure of the available data areas present on a disc such that time for accessing subsequent fragments is kept to a minimum, even when free space areas are present.

Figure 8:
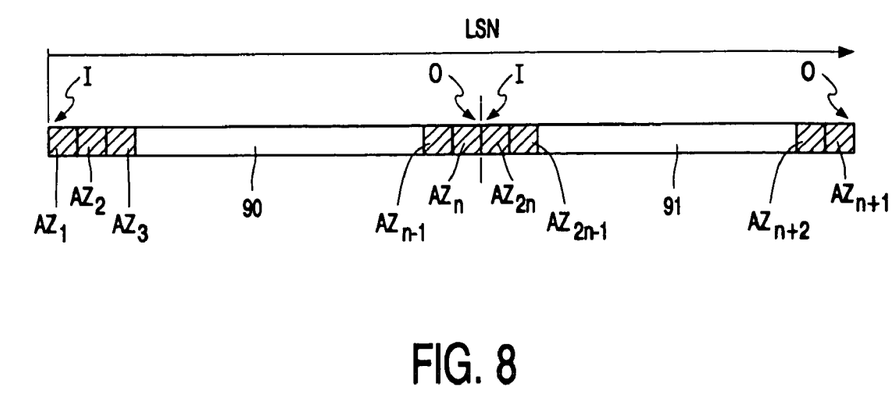
FIG. 8 the logical address space of a disc like recording medium.

FIG. 8 shows an example of a logical address space, addressable by a logical sector number LSN, in case of a disk with groove and land tracks. The first half 90 of the sequence of logical sector numbers LSN is reserved for the groove tracks while the second half 91 of the sequence of logical sector numbers LSN is reserved for the land tracks. The logical sector numbers LSN are divided into successive allocation zones $AZ_i$, of the type as disclosed with reference to FIG. 5I or 3D, of more or less the same size and spanning contiguous parts of the disc. Note that the allocation zones $AZ_i$ are numbered continuously in this example. An allocation area may comprise several allocation zones. In the groove track part 90, the allocation zone numbering increases from the inner side I to the outer side O with $AZ_1$ to $AZ_n$. In the land track part 91, however, the zone numbering decreases from the inner side I to the outer side O with $AZ_{2n}$ to $AZ_{n+1}$. In this way, the allocation zones are physically close together and the last zone $AZ_{2n}$ is physically close to the first allocation zone $AZ_1$.

Figure 9:
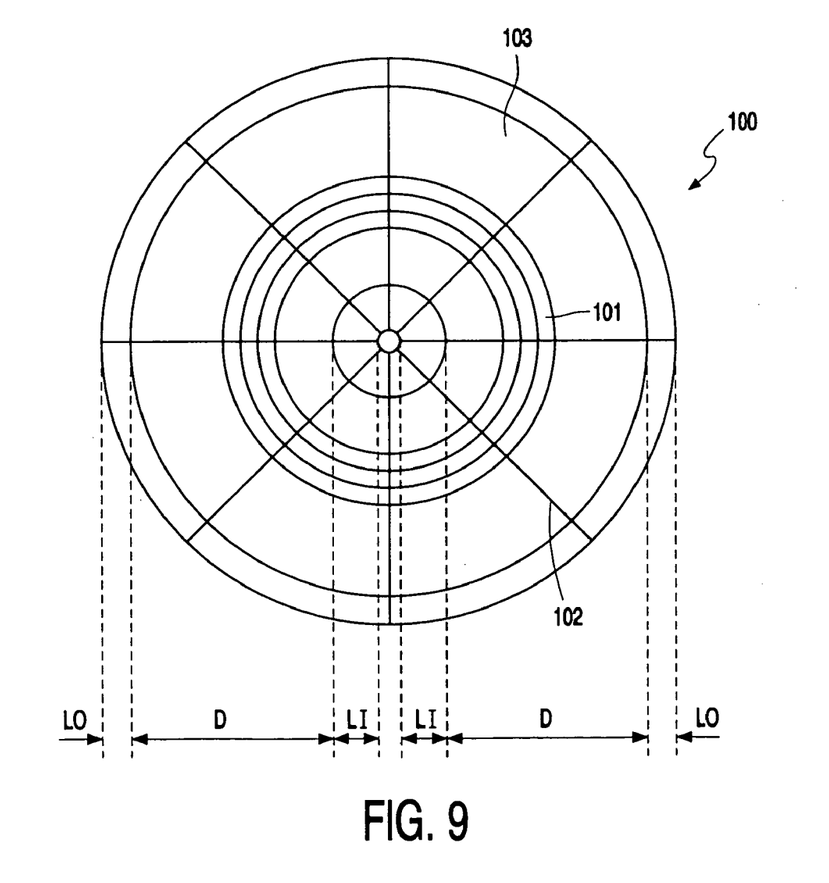
FIG. 9 an arrangement of tracks in physical annular bands and segments of a disc like recording medium and FIG. 10 an apparatus according to the invention for simultaneously recording/reproducing a real time data stream on/from a disc like recording medium.

FIG. 9 shows an example of an optical disc 100 comprising, apart from a lead-in zone LI and a lead-out zone LO, a data zone D that is divided into successive annular bands 101 of multiple tracks of one revolution each, although not shown individually. Further are shown radial extending embossed areas 102 containing address information and dividing the tracks in separate segments 103, in this example dividing a one circular track in 8 segments. As for example, an annular band 101 may comprise hundreds of groove tracks and hundreds of land tracks and there may be hundred of annular bands 101 spanning the data area D. The optical disc 100 is intended to operate with a constant angular velocity in each separate annular band 101, with a relative high angular velocity for the inner annular bands 101 and a relatively low angular velocity for the outer annular bands 101. An annular band 101 may contain hundreds of fragments such as employed for allocating data according to the invention, as illustrated with reference to FIG. 5 en FIG. 6, where a fragment may contain 2 to 8 Mbyte of data while a logical sector number LSN may refer to amount of data of 2 Kbyte. Logical sector numbers LSN may be employed for addressing non real time data, while fragments may be employed for addressing real time data. The addressing logic will be able to maintain a sector based address table as well as a fragment based address table. The fragment numbering, as for example, will be increasing from 0 to 1050 for the groove tracks and from 1051 to 2100 for the land tracks.

Figure 10:
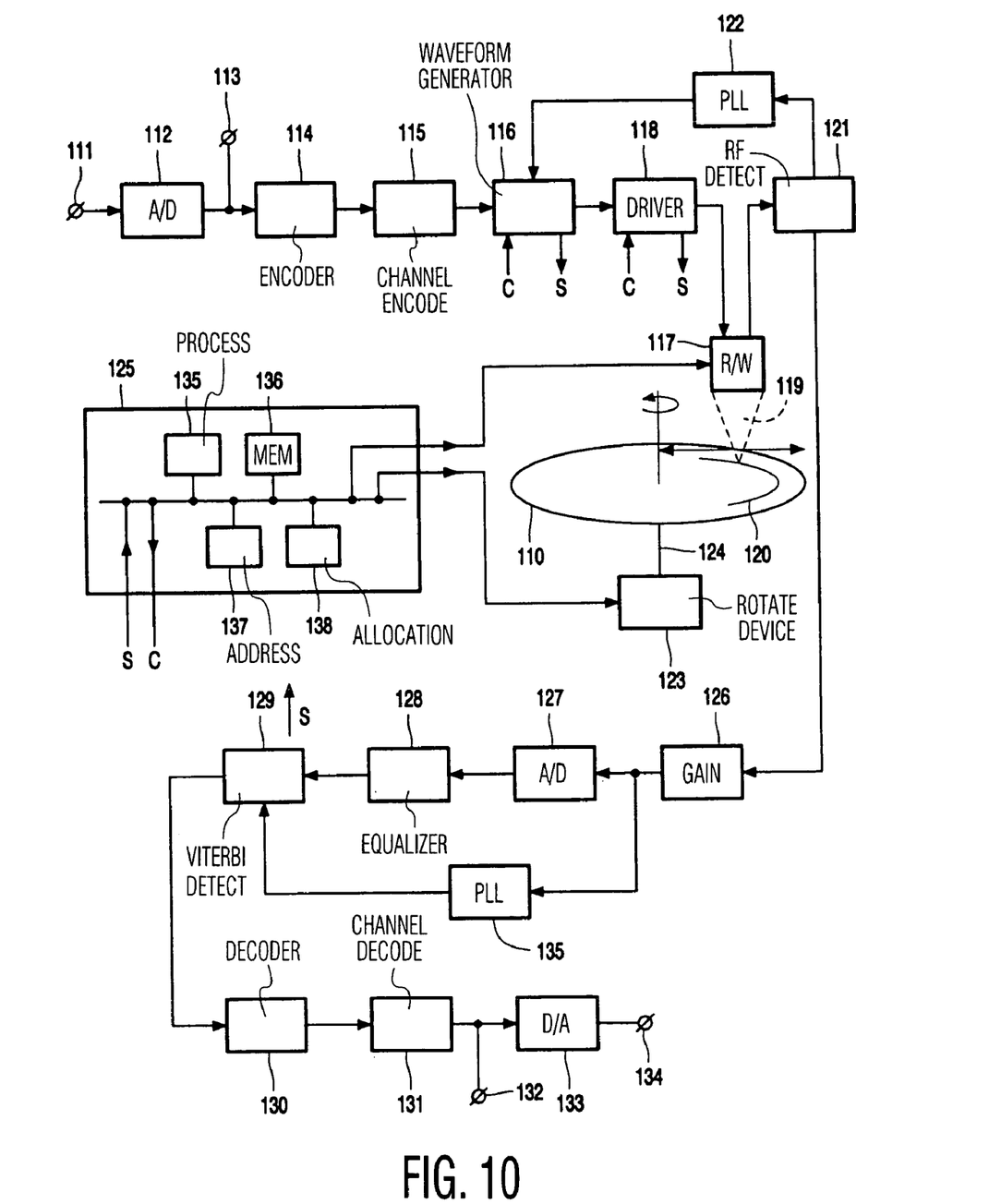

FIG. 10 shows a reproduction/recording device for reproducing/recording real time A/V information on/from a disc like record carrier 110 of the optical type. Real time A/V information may be inputted in analog form at an input terminal 111 for analog to digital conversion with an A/D converter 112. Data already available in digital form may be inputted at a second input terminal 113 connected to an encoder 114 for compressing the digital data according to for instance MPEG-1, MPEG-2 in case of video and audio or AC3 in case of audio. The encoder 114 may further comprise suitable error correction coding. Next the compressed and error corrected encoded data is supplied to suitable channel encoding means 115 for generating a corresponding channel code adapted to submit to a transmission channel, in this case the recording medium 110. This may result in an EFM+ code in Non Return To Zero (NRZI) format, such as known form DVD. The channel-encoded data is next submitted to a waveform generator 116 for generating a write signal adapted to apply marks on the recording medium 110. The marks are written with a high power laser device present in the single reading/writing head assembly 117, controlled by a laser driver 118. The laser device projects a focused laser beam 119 on a spot of a track 120 of the recording medium 110, changing locally the optical characteristics of the medium 110. Light reflected from the recording medium 110 during applying marks, is detected by suitable light sensitive detectors, also present in the reading/writing head assembly 117. The generated RF signal therefrom is submitted to a suitable RF detector 121 which extracts a synchronization signal therefrom for submittal to a phase lock loop circuit 122 in order to synchronize the generation of the wave forms of the wave form generator 116. To this purpose the recording medium may comprise embedded synchronization marks in header parts of preformed tracks. The disc like recording medium 110 is rotationally driven by a rotating device 123 around an axis 124, the angular velocity thereof being controlled by a control unit 125. The control unit 125 further controls the linear displacement of the reading/writing head assembly 117 along the radius of the recording medium 110. This replacement may be done with a relatively large displacement of a sledge or by a relatively small displacement of an optical unit itself within the reading/writing head assembly 117.

Control unit 125, may comprise one or more processing units 135 with one or more memory means 136 for providing each unit with control information C or receiving from each unit synchronization, address or speed information S. To this purpose the control unit 125 may comprise firmware or dedicated hardware for controlling the device according to the invention. The control unit 125 further comprises addressing means 137 to perform addressing in a logical address space, to map this addressing to a physical address space and to control the reading/writing assembly 117 and rotating device 123 to locate to read or write a corresponding physical address. Further allocation means 138 are provided to allocate address areas in accordance with the invention. To this purpose, a table in memory containing information on already written allocation extents and remaining free space may be employed. This table may comprise in which allocation area and/or allocation zone an allocation extent of a specific program is being written. This table may be recorded on the recording medium itself The reading/writing head assembly 117 further employs a laser beam to scan previously recorded marks, the reflection thereof being detected by a suitable radiation sensitive detector within the reading/writing head assembly 117, the signals thereof also being submitted to the R/F detector 121. The detected R/F signals during a read operation are fed to a automatic gain circuit 126, which is connected to a analogue to digital converter 127. The output thereof is fed to an equalizer circuit 128, the output of which it submitted to a suitable detector, such as a Viterbi detector 129, for detecting signal level crossings. To this purpose the detector 129 receives synchronization information from a second phase locked loop circuit 135, which derives its input signal from the AGC circuit 126. The detector 129 submits detected synchronization information S to the control unit 125, in order to adjust the rotational speed. In case of a writing operation the control unit 125 receives similar synchronization information S from the waveform generator 116. The detected signal crossings are submitted to a channel decoder 130 for decoding the channel-encoded information. Decompression and error correction of the decoded channel data is done with a suitable decoder 131. The output thereof is available in digital form at an output terminal 132 or in analogue form at an output terminal 134 of a connected digital to analogue converter 133.

As said before, the control unit 125 is adapted to control the reading and writing operation in accordance with the method of the invention, either by firmware, hardware or a mixture of both.

Although the invention has been described with reference to preferred embodiments thereof, it is to be understood that these are not limitative examples. Thus, various modifications thereof may become apparent to those skilled in the art, without departing from the scope of the invention, as defined by the claims. For instance, although the invention is described with reference to one spiral track, the invention may also applied to circular tracks. Marks in case of a record carrier of the optical type may take the form of local depressions but also of optically differently reflecting area, such as crystalline mater in either crystalline or amorphous state. The invention may be implemented by means of both hardware and software, and that several "means" may be represented by the same item of hardware. Further, the invention lies in each and every novel feature or combination of features. It is also remarked that the word "comprising" does not exclude the presence of other elements or steps than those listed in a claim. Any reference signs do not limit the scope of the claims.

What is claimed is:

1. A method of recording a sequence of ordered real-time information signals on a disc recording medium, the method comprising:

applying a sequence of marks, representing a sequence of information signals of a recording, along a spiral track on the disc recording medium, wherein the marks are allocated contiguously in fragments, the fragments being separately addressable, allocating allocation extents of at least one fragment, with fragments within an allocation extent allocated contiguously, the allocation extents located in a distributed manner over the recordable area of the disc recording medium with free space areas in the neighborhood of the separate allocation extents, said free space being available for subsequently allocating allocation extents of a subsequent recording, and allocating allocation extents representing neighboring real time information signals in the ordered sequence of information signals spatially in each other neighborhood on the disc recording medium.

2. A method according to claim 1, further comprising allocating allocation extents in consecutive order in either inward or outward direction along the radius of the recording medium.

3. A method according to claim 2, further comprising continuing allocating allocation extents in a reversed order from the inner, respectively the outer diameter of a recordable area of the recording medium when reaching the inner, respectively the outer diameter.

4. A method according to claim 1, further comprising dividing a logical address space related to the recording medium in successive allocation areas, dividing each allocation area in allocation zones, and
allocating the allocation extents in the allocation zones.

5. A method according to claim 1, wherein the disc recording medium is divided in successive annular bands, the annular bands spanning contiguous parts of the disc recording medium, while rotating the disc recording medium with a constant angular velocity during recording in an annular band, further comprising allocating an allocation extent in an annular band, wherein successive allocation extents are allocated in successive annular bands, an annular band having a size adapted to allocate therein additional allocation extents representing a second recording.

6. A method according to claim 1, wherein the recording medium is adapted to record marks of the optically readable type in mutually alternating spiral groove and land tracks, further comprising allocating an allocation extent either in a groove track or in a land track.

7. A method according to claim 4, further comprising allocating successive allocation zones located in groove tracks in a first order and in land tracks in a second, opposite order.

8. A method according claim 1, for recording a second sequence of marks, representing real-time information signals of a second recording, further comprising:

allocating successive allocation extents of at least one fragment of the second sequence in the neighborhood of the successive allocation extents of the first sequence, in a distributed manner over the recordable area of the disc recording medium with free space areas in the neighborhood of the allocated allocation extents, said free space being available for allocation of further allocation extents of subsequent sequences.

9. A method of simultaneously reproducing and recording sequences of ordered real-time information signals, from or on a disc recording medium, wherein at least a first sequence of marks, representing the information signals of a first recording, has been recorded according to claim 1, the method comprising alternately:

reading from the disc recording medium at least one recorded fragment of at least one allocation extent of the first sequence of marks for reproduction, and allocating on the disc recording medium at least one fragment of at least one allocation extent of a subsequent, second sequence of marks, representing information signals of a second recording, for recording in the neighborhood of the at least one previous and/or next fragment of the first sequence read.

10. A method according to claim 9, wherein allocating fragments of a recording is performed with a first data rate and reading fragments of a recording is done with a second, different data rate, the method comprising alternately allocating a first number of fragments and reading a second number of fragments, wherein the first, respectively second number is determined by the first, respectively second data rate.

11. A disc recording medium, provided with marks representing real time information signals, allocated in response to the method of recording marks according to claim 1.

12. An apparatus adapted to record a sequence of real-time information signals on a disc recording medium the apparatus comprising:

a receiver adapted to receive real time information signals for recording, a writing head adapted to apply a sequence of marks, representing a sequence of real time information signals of a recording, along a spiral track of the disc recording medium, and a controller adapted to control the writing head thereby applying the marks in separately addressable fragments of contiguously recorded marks, the apparatus comprising:

allocation means adapted to allocate allocation extents of at least one fragment, with fragments within a allocation extent allocated contiguously, the allocation extents located in a distributed manner over the recordable area of the disc recording medium with free space areas in the neighborhood of the separate allocation extents, said free space being available for applying further allocation extents of a subsequent recording and the control means are adapted to control the writing means to apply marks in the allocation extents, and the allocation means are adapted to allocated allocation extents representing neighboring real time information signals in the ordered sequence of information signals, spatially in each other neighborhood on the disc recording medium.

13. An apparatus according to claim 12, wherein the allocation means are adapted to allocate the allocation extents in consecutive order in either inward or outward direction along the radius of the recording medium.

14. An apparatus according to claim 13, wherein the allocating means are adapted to continue allocate allocation extents in a reversed order from the inner, respectively the outer diameter of a recordable area of the recording medium when reaching the inner, respectively the outer diameter.

15. An apparatus according to claim 12, wherein the apparatus comprises addressing means adapted to divide a logical address space related to the recording medium in successive allocation areas and to divide each allocation area in allocation zones and the allocation means are adapted to allocate the allocation extents in the allocation zones.

16. An apparatus according to claim 12, adapted to operate with a disc recording medium that is divided in successive annular bands, the annular bands spanning contiguous parts of the disc recording medium, and adapted to rotate the disc recording medium with a constant angular velocity during recording in an annular band, wherein the allocation means are adapted to allocate an allocation extent in an annular band, with successive allocation extents allocated in successive annular bands, an annular band having a size adapted to allocate therein additional allocation extents representing a second recording.

17. An apparatus according to claim 12, adapted to apply marks of the optically detectable type in mutually alternating spiral groove and land tracks of the recording medium, wherein the allocation means are adapted to allocate an allocation extent either in a groove track or in a land track.

18. An apparatus according to claim 17, wherein the allocation means are adapted to allocate successive allocation zones in groove tracks in a first order and in land tracks in a second, opposite order.

19. An apparatus according to claim 12, for recording a second sequence of marks, representing real-time information signals of a second recording, wherein the allocation means are adapted to allocate successive allocation extents of at least one fragment of the second sequence in the neighborhood of the successive allocation extents of the first sequence, in a distributed manner over the recordable area of the disc recording medium with free space areas in the neighborhood of the allocated allocation extents, said free space being available for appliance of further allocation extents of subsequent sequences.

20. An apparatus for simultaneously reproducing and recording sequences of ordered real time information signals from or on a disc recording medium, wherein the information signals are recorded on the disc recording medium by marks arranged along a spiral track of the disc recording medium and are allocated in addressable fragments of contiguously recorded marks, wherein at least a first sequence of marks, representing the information signals of a first recording, has been recorded according to the method of claim 1, the apparatus comprising:

a receiver adapted to receive real time information signals for recording, a writing head adapted to apply a fragment of marks representing information signals received by the receiving means on the disc recording medium, a reading head adapted to read at least a fragment of marks from the disc recording medium, reproducing means for reproducing real time information signals represented by the marks read, characterized in that, the apparatus comprises a controller adapted to control the reading head and writing head in order to alternately:

read at least one recorded fragment of at least one allocation extent of the first sequence for supply to the reproducing means and allocate at least one fragment of at least one allocation extent of a subsequent, second sequence of marks, representing information signals of a second recording, in the neighborhood of the at least one fragment of the first recorded sequence read and/or the next fragment of the first recorded sequence to read.

21. An apparatus according to claim 20, adapted to apply fragments of marks of a recording with a first data rate and to read fragments of a recording with a second, different data rate, wherein the controller is adapted to control alternately:

the writing head to apply a first number of fragments of marks wherein the first number is determined by the first data rate, and the reading head to read a second number of fragments of marks wherein the second number is determined by the second data rate.

* * * * *